UNITED STATES PATENT OFFICE 2,461,352

WATER-IN-OIL EMULSION PAINTS CONTAINING A LEAFING PIGMENT

Vaughn R. Smith, El Cerrito, and Don E. Stevens, Fairfax, Calif., assignors to California Research Corporation, San Francisco, Calif., a corporation of Delaware No Drawing. Application November 6, 1946, Serial No. 708,179

9 Claims. (Cl. 106—269)

This invention relates to coating composition, paints and the like.

Aluminum paints are becoming more and more popular within the painting trade. Aluminum paint, when properly applied, presents a continuous metal surface coating; the aluminum particles overlap and interlace each other in such a manner as to form a solid coating of metal. The formation of this solid metal coat is beneficial in a number of respects. In the first place, the painted article or structure is wholly coated giving it the maximum protection from the action of the atmosphere. The metal coat has high opacity and low moisture permeability, providing a surface protection for a longer period of time than is provided by the usual pigment-type paint. Furthermore, an aluminum paint presents a generally clean, bright, pleasant appearance to the painted article or structure.

It has been an object of the paint industry to produce an inexpensive aluminum paint which would be stable in storage, e. g., an aluminum paint in which the aluminum particles would retain the property of leafing to the surface. The major portion of the aluminum paint which is sold on the present market is sold in two separate containers; i. e., the vehicle container (the container for the fluid medium in which the aluminum is dispersed) and the aluminum powder container. The paint vehicle (i. e., the fluid medium in which the aluminum powder is dispersed) and the aluminum powder must be mixed as needed just prior to use. If this mixed paint is permitted to stand, the aluminum particles gradually lose their property to leaf to the surface of the vehicle, and it has not been possible to reimpart this leafing property to the aluminum particles.

By leafing is meant that characteristic of an aluminum paint which results in the floating of the aluminum particles to the surface of the vehicle resulting in an interlacing and layering of the aluminum particles to give the desired solid protective covering for the painted surface.

Ready-mix aluminum paints (i. e., those paints in which all of the ingredients are mixed together in one container by the manufacturer) are produced and marketed at the present time, but the high cost of the ingredients used to retain the proper leafing quality of the aluminum powder precludes the possibility of an inexpensive widely usable aluminum paint.

Although the advantages of this invention are primarily directed to the coating compositions containing aluminum as the leafing pigment, the advantages are also applicable to coating compositions containing other leafing pigments.

It is an object of this invention to produce an inexpensive ready-mix leafing pigment paint.

It is another object of this invention to produce a ready-mix leafing pigment paint which may be sold in one container.

It is a further object of this invention to produce a leafing pigment paint in which the leafing pigment will retain its ability to leaf to the surface of the paint vehicle.

It is also an object of this invention to produce an inexpensive ready-mix aluminum paint.

It is a still further object of this invention to produce a coating composition in which the leafing pigment will retain its ability to leaf to the surface of the paint vehicle.

It is still another object of this invention to produce a ready-mix leafing pigment paint which permits the presence of a smaller amount of leafing pigment per gallon of paint than has heretofore been required.

Further and other pertinent objects of this invention will become apparent from the following description and the appended claims.

The coating compositions of this invention comprise a base and a solvent for the base (which together constitute the vehicle of the coating composition), a leafing pigment and water; the water being dispersed in the vehicle in the form of a water-in-oil emulsion.

By means of such an emulsion, the leafing properties of the pigment are improved and other advantages result, as described herein below.

The base is a thermoplastic substance. The thermoplastic substance will normally be selected from a group of bituminous substances (petroleum asphalt, natural asphalts, coal tars and coal tar pitches). However, other thermoplastic substances may serve as the base for the paint vehicle of this invention (e. g., alkyd resins, ester gums, butene polymers and similar thermoplastic substances).

It is preferred to use a petroleum asphalt as the base for the paint vehicle. The petroleum asphalt may be a residual asphalt or an air-blown asphalt having penetration values of 0 to 300 (ring and ball method). However, it is preferred to use an asphalt having penetration values of 0 to 50.

The solvent used in the composition of this invention may be any solvent or combination of solvents in which the base is soluble. It is desirable to use a solvent which has a surface tension of 20 to 78 gammas, preferable 26 to 50 gammas. The solvents which may be used include the following: benzene, xylene, toluene, pseudocumene, petropine, carbon tetrachloride, petroleum thinners, etc., and mixtures thereof, such as equal portions of benzene and a light petroleum thinner having a boiling point range of 300° F. to 400° F., or a mixture consisting of 10 parts (by weight) of toluene, 5 parts gum turpentine, and 85 parts of a light petroleum thinner.

The leafing pigment of this invention may be any metallic matter (e. g., copper, aluminum and chromium) which may be produced or procured in a flaky form as contrasted to a cubical form or a spherical form. The leafing pigment of primary concern in this invention is the aluminum leaf.

The base, the solvent and the pigment thus used are the usual ingredients of coating compositions of the type with which this invention is concerned. They may be mixed together in the usual proportions and by the usual methods. However, the inclusion of water, in the form of a water-in-oil emulsion, with the above ingredients (the base, the solvent and the leafing pigment) as disclosed herein, allows the use of substantially smaller amounts of pigment. Also, improved leafing properties and other advantages are obtained by the employment of water in the composition, dispersed therein in the form of a water-in-oil emulsion.

Such water-in-oil emulsion may be produced by any suitable method, with or without the aid of an emulsifying agent. Thus, water and the vehicle may be introduced into a colloid mill to produce a water-in-oil type emulsion without the aid of an emulsifying agent; or water may be dispersed in the vehicle with the aid of any suitable emulsifying agent. To the water-in-oil emulsion is then added the pigment. This particular sequence of steps need not, however, be followed, as long as the ultimate object of a water-in-oil type emulsion containing the desired ingredients is produced.

Preferably, however, an emulsifying agent is used to produce the water-in-oil emulsion; and this emulsifying agent is preferably an alkali metal soap of a fatty acid containing 12 or more carbon atoms. Examples of suitable alkali metal soaps of fatty acids are: sodium laurate, potassium laurate, sodium myristate, sodium palmitate, sodium stearate, sodium arachidate, sodium oleate and sodium ricinoleate. Examples of other very effective emulsifying agents which may be used include starch, sodium bicarbonate and the alkali metal salts of petroleum sulfonic acids; e. g., sodium petroleum sulfonate.

The products of the invention as thus far described comprise a vehicle, a leafing pigment and water dispersed in the vehicle with or without an emulsifying agent. These products may also contain a fatty acid of 12 or more carbon atoms; such acids further enhance the leafing properties of the pigment. The fatty acid may be added at any stage of the compounding procedure or to the finished product. Examples of fatty acids are: lauric acid, myristic acid, palmitic acid, stearic acid, arachidic acid, melissic acid, oleic acid and ricinoleic acid.

Typical formulas of compositions of the invention are as follows:

*Example I.*—No emulsifying agent employed.

Base _____ 5% to 60%, preferably 20% to 50%
Solvent ___ 20% to 80%, preferably 40% to 60%
Pigment ____ 2% to 40%, preferably 4% to 10%
Water _____ 2% to 70%, preferably 10% to 30%

*Example II.*—A fatty acid added to composition wherein no emulsifying agent is employed:

Base_____ 5% to 60%, preferably 20% to 50%
Solvent_____ 20% to 80%, preferably 40% to 60%
Pigment_____ 2% to 40%, preferably 4% to 10%
Fatty acid__ 0.01% to 10%, preferably 0.1% to 2%
Water_____ 2% to 70%, preferably 3% to 10%

*Example III.*—Emulsifying agent employed:

Base_____ 5% to 60%, preferably 20% to 50%
Solvent_____ 20% to 80%, preferably 40% to 60%
Pigment_____ 2% to 40%, preferably 4% to 10%
Emulsifying agent____ .01% to 10%, preferably 0.1% to 2%
Water_____ 2% to 70%, preferably 3% to 10%

*Example IV.*—A fatty acid added to a composition wherein an emulsifying agent is employed:

Base_____ 5% to 60%, preferably 20% to 50%
Solvent_____ 20% to 80%, preferably 40% to 60%
Pigment_____ 2% to 40%, preferably 4% to 10%
Emulsifying agent___ 0.01% to 10%, preferably 0.1% to 2%
Fatty acid__ 0.01% to 10%, preferably 0.1% to 2%
Water_____ 2% to 70%, preferably 3% to 10%

Typical formulas for stable coating compositions (specifically aluminum paint) are as follows:

I

| Ingredients | Per Cent |
| --- | --- |
| 11-20 Penetration Asphalt | 28 |
| Aromatic Petroleum Thinner | 39 |
| Aluminum | 8 |
| Water | 25 |
| | 100 |

II

| Ingredients | Per Cent |
| --- | --- |
| 31-40 Penetration Asphalt | 36.3 |
| Benzene | 50.7 |
| Stearic Acid | 1.5 |
| Aluminum | 8.0 |
| Water | 3.5 |
| | 100 |

III

| Ingredients | Per Cent |
| --- | --- |
| 0-5 Penetration Asphalt | 36.3 |
| Benzene | 51.9 |
| Water | 3.5 |
| Aluminum | 8.0 |
| Sodium Stearate | 0.3 |
| | 100 |

IV

| Ingredients | Per Cent |
| --- | --- |
| 0-5 Penetration Asphalt | 36.3 |
| Benzene | 51.8 |
| Water | 3.5 |
| Aluminum | 8.0 |
| Sodium Stearate | 0.3 |
| Stearic Acid | 0.1 |
| | 100 |

The following examples will further illustrate the practice of this invention:

*Example V.*—A high sulfur content (4.2%) California crude residuum was air-blown to produce an asphaltic stock having a melting point range of 145° F. to 155° F. (ring and ball method). To 30 parts by weight of this warm asphaltic stock was added 41 parts by weight of a highly aromatic (45% aromatic) petroleum thinner. This whole asphalt-thinner mix plus 25 parts of water were slowly poured into a colloid mill in separate streams in a ratio of 71 parts by weight of asphalt-thinner mix to 25 parts by weight of water to produce a water-in-oil type emulsion. This emulsion was again passed through the colloid mill. To 4 parts by weight of aluminum powder (standard varnish grade) was added sufficient amount of this water-in-oil emulsion to form a paste. Further quantities of the emulsion were added until a thin slurry resulted. The remainder of the emulsion was then added and stirred until a homogeneous finished composition was obtained.

*Example VI.*—A high sulfur content (4.2%) California crude residuum was air-blown to produce an asphaltic stock having a melting point range of 145° F. to 155° F. (ring and ball method). To 40 parts by weight of this warm asphalt stock was added 60 parts by weight of a highly aromatic (45% aromatic) petroleum thinner. After this hydrocarbon solution had been allowed to cool, there was added, with stirring, a solution of 0.4 part by weight of sodium stearate in 3.5 parts by weight of water, thus producing a water-in-oil emulsion. To 6 parts by weight of aluminum powder (standard varnish grade) was added a sufficient amount of this water-in-oil emulsion to form a paste. Further quantities of the emulsion were added until a thin slurry resulted. The remainder of the emulsion was then added and stirred until a homogeneous finished composition was obtained.

The leafing properties of this coating composition so prepared have remained stable for a period of time in excess of one year.

*Example VII.*—A butene polymer stock was air-blown to produce a resinous stock having a melting point of 175° F. to 185° F. (ring and ball method). To 40 parts by weight of this resin was added 50 parts by weight of a highly aromatic petroleum thinner. To this hot resinous solution was added 0.5 part by weight of stearic acid, with thorough agitation. The above mixture was cooled, and a solution of 0.3 part by weight of sodium stearate in 5 parts by weight of water was then thoroughly stirred into the resin mix. 20 parts by weight of standard varnish grade aluminum powder was incorporated into the mix in a procedure similar to that outlined above in Example I, until a homogeneous finished composition was obtained.

The leafing properties of this coating composition so prepared have remained stable for a period of time in excess of one year.

We claim:
1. A fluid leafing pigment paint consisting of by weight 2-40% leafing pigment and the remainder consisting essentially of a paint vehicle, said paint vehicle being an emulsion with water as the internal phase and an organic, water-insoluble, thermoplastic paint base as the external phase.
2. The composition of claim 1, wherein said leafing pigment is aluminum.
3. The composition of claim 1, wherein said paint vehicle is an emulsion with water as its internal phase and a blend of asphalt and asphalt solvent as the external phase.
4. The composition of claim 1 containing, as a leafing promoter, .01-10% by weight of a fatty acid containing not less than 12 carbons.
5. The composition of claim 1 containing, as a leafing promoter, .01-10% by weight stearic acid.
6. The composition of claim 1 containing, as an emulsifier, .01-10% by weight of an alkali metal salt of a fatty acid containing not less than 12 carbon atoms.
7. The composition of claim 1 containing, as an emulsifier, .01-10% by weight of sodium stearate.
8. A fluid leafing pigment paint consisting of by weight 2-40% aluminum leafing pigment and the remainder consisting essentially of an emulsion having water as its internal phase and a solution of asphalt in a hydrocarbon solvent as its external phase, and, as a leafing promoter, .01-10% by weight of a fatty acid containing not less than 12 carbon atoms and, as an emulsifier, .01-10% by weight of an alkali metal salt of a fatty acid containing not less than 12 carbon atoms.
9. A fluid leafing pigment paint consisting of by weight 2-40% aluminum leafing pigment and the remainder consisting essentially of an emulsion having water as its internal phase and a solution of asphalt in a hydrocarbon solvent as its external phase, and, as a leafing promoter, .01-10% by weight stearic acid and, as an emulsifier, .01-10% by weight sodium stearate, said paint being capable of being stored without substantial loss in leafing properties.

VAUGHN R. SMITH.
DON E. STEVENS.

REFERENCES CITED

The following references are of record in the file of this patent:

UNITED STATES PATENTS

| Number | Name | Date |
|---|---|---|
| 1,568,215 | Fleming | Jan. 5, 1926 |
| 1,733,493 | Kirschbraun | Oct. 29, 1929 |
| 1,765,676 | Jones | June 24, 1930 |
| 2,068,966 | Thurston et al. | Jan. 26, 1937 |
| 2,002,891 | Hall | May 28, 1935 |